US008095870B2

(12) United States Patent
Jiang et al.

(10) Patent No.: US 8,095,870 B2
(45) Date of Patent: Jan. 10, 2012

(54) EXTENSIBLE DOCUMENT TRANSFORMATION LANGUAGE: AN INNOVATIVE WAY OF GENERATING BUSINESS DOCUMENT AND REPORT

(75) Inventors: Xin Jiang, Foster City, CA (US); Shirley Hong Zeng, San Ramon, CA (US); Tomoji Ashitani, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 905 days.

(21) Appl. No.: 11/758,783

(22) Filed: Jun. 6, 2007

(65) Prior Publication Data
US 2008/0306981 A1    Dec. 11, 2008

(51) Int. Cl.
*G06F 17/00* (2006.01)
*G06F 15/00* (2006.01)
(52) U.S. Cl. .......... 715/236; 707/999.102; 707/E17.058
(58) Field of Classification Search .................. 715/243, 715/212, 236, 249; 707/999.102, 1, E17.058; 1/1
See application file for complete search history.

(56) References Cited

U.S. PATENT DOCUMENTS

| | | | | |
|---|---|---|---|---|
| 6,643,652 | B2 * | 11/2003 | Helgeson et al. ...................... 1/1 |
| 2003/0097635 | A1 * | 5/2003 | Giannetti ................... 715/501.1 |
| 2004/0153465 | A1 * | 8/2004 | Singleton et al. ............. 707/100 |
| 2004/0172584 | A1 * | 9/2004 | Jones et al. .................... 715/500 |
| 2005/0086584 | A1 * | 4/2005 | Sampathkumar et al. . 715/501.1 |
| 2006/0048096 | A1 * | 3/2006 | Jiang et al. .................... 717/115 |
| 2006/0101333 | A1 * | 5/2006 | Collie et al. ................... 715/513 |
| 2008/0120323 | A1 * | 5/2008 | Etwaru et al. ................. 707/102 |
| 2008/0243823 | A1 * | 10/2008 | Baris et al. ......................... 707/5 |

OTHER PUBLICATIONS

Talbott1 et al. Mapping Physical Formats to Logical Models to Extract Data and Metadata: The Defuddle Parsing Engine, 2006, pp. 74-81.*
Guillen et al., GARP: A Tool for Creating Dynamic Web Reports Using XSL and XML Technologies, Proceedings of the fourth Mexican International Conference on Computer Science (ENC'03), pp. 1-6.*
Guillen et al., GARP: A Tool for Creating Dynamic Web Reports Using XSL and XML Technologies, Proceedings of Fourth Mexican International Conference on Computer Science (ENC'03, pp. 1-6).*
Guillen et al., GARP: A Tool for Creating Dynamic Web Reports Using XSL and XML, Proceedings of the Fourth Mexican International Conference on Computer Science (ENC'03), published 2003, pp. 1-6.*

* cited by examiner

*Primary Examiner* — Stephen Hong
*Assistant Examiner* — Ahamed I Nazar
(74) *Attorney, Agent, or Firm* — Kilpatrick Townsend and Stockton LLP (57) ABSTRACT

In various embodiments, a method for generating documents in native application formats includes receiving a document template as a first document according to a native format. The first document is parsed to generate an Extensible Document Transformation Language (XDTL) template representing the document template. An XDTL execution document is generated based on the XDTL template. A second document is then generated according to the native format based on the XDTL execution document.

19 Claims, 8 Drawing Sheets

```
600
<excel>
 <row num="1">
  <cell num="1" type="number">1</cell>
  <cell num="2" type="formula">A1+1</cell>
 </row>
</excel>
```

FIG. 6

```
700
<data>
 <Repeat1>
  <Parameter1>10</Parameter1>
 </Repeat1>
 <Repeat1>
  <Parameter1>20</Parameter1>
 </Repeat1>
</data>
```

FIG. 7

```
800
<excel>
 <xsl:for-each select="Repeat1">
  <row num="1">
   <cell num="1" type="number"><xsl:value-of select="Parameter1"/></cell>
   <cell num="2" type="formula">A1+1</cell>
  </row>
 </xsl:for-each>
</excel>
```

FIG. 8

```
900
<excel>
 <row num="1">
  <cell num="1" type="number">10</cell>
  <cell num="2" type="formula">A1+1</cell>
 </row>
 <row num="1">
  <cell num="1" type="number">20</cell>
  <cell num="2" type="formula">A1+1</cell>
 </row>
</excel>
```

EXTENSIBLE DOCUMENT TRANSFORMATION LANGUAGE: AN INNOVATIVE WAY OF GENERATING BUSINESS DOCUMENT AND REPORT

CROSS-REFERENCES TO RELATED APPLICATIONS

The present disclosure may be related to the following commonly assigned applications/patents:

This application is related to U.S. patent application Ser. No. 10/925,768 filed Aug. 24, 2004 and entitled "RTF Template and XSL/FO Conversion: A New Way to Create Computer Reports;" and This application is related to U.S. patent application Ser. No. 11/383,069 filed May 12, 2006 and entitled "XSL Transformation and Translation."

The respective disclosures of these applications/patents are incorporated herein by reference in their entirety for all purposes.

BACKGROUND OF THE INVENTION

The present invention relates to information systems. More specifically, the present invention relates to techniques for creating native documents and reports using templates.

Enterprises store large amounts of data using databases. Users often create and distribute reports including data from the database to other people within or outside the enterprise. Typically, these reports need to present and summarize the data in a clear and compelling manner. Therefore, users create reports using rich content, including text formatting, tables, and charts. One way of creating rich content reports is to extract the necessary data from the database, create a report in a word-processing, spreadsheet, or other applications, and manually insert the data into the appropriate portions of the report. This approach is time-consuming and error-prone. Additionally, when reports need to be revised with new or updated data, the user must extract the new data from the database and edit the report manually.

One prior approach automates report generation by using a document layout designing language, such as the Extensible Stylesheet Language Family (XSL), to create a document template. The document template can then be combined with report data from the database to create a report. If the report data from the database or other application includes metadata, such as the Extensible Markup Language (XML), then reports can be generated automatically anytime data is changed or updated.

One problem with document layout designing languages such as XSL is they are difficult for non-programmers to use. Managers, analysts, and other users within an enterprise do not have the ability to create or edit templates written in these languages. As a result, if a user needs to create a template, he or she creates an example or specification of the report that indicates the formatting and the location of report data in the report and sends it to a programmer who then creates the actual template in a document layout designing language. This increases the amount of time and expense needed to create templates used to automate report generation.

It is therefore desirable for a system and method to enable users to create templates used to automatically generate reports without resorting to document layout designing languages. It is further desirable that the system allow users to create templates using common software applications, rather than unfamiliar and specialized software applications.

Accordingly, what is desired are improved methods and apparatus for solving the problems discussed above, while reducing the drawbacks discussed above.

BRIEF SUMMARY OF THE INVENTION

The present invention relates to information systems. More specifically, the present invention relates to techniques for creating native documents and reports using templates.

In various embodiments, a method for generating documents in native application formats includes receiving a document template as a first document according to a native format. The first document is parsed to generate an Extensible Document Transformation Language (XDTL) template representing the document template. An XDTL execution document is generated based on the XDTL template. A second document is then generated according to the native format based on the XDTL execution document.

In some embodiments, data is received from a database. Generating the XDTL execution document representing the second document may include performing one or more transformations specified by the XDTL template with the data to generate the XDTL execution document. One or more named parameters may be received associated with the first document. Generating the XDTL execution document representing the second document may include generating one or more statements representing the named parameters associated with the first document in the XDTL execution document.

In various embodiments, logic associated with the first document may be received. Generating the XDTL execution document representing the second document may include generating one or more statements representing the logic associated with the first document in the XDTL execution document. Rendering the second document in the native format may include receiving layout information associated with the first document. The second document may be rendered based on the layout information.

In some embodiments, rendering the second document in the native format includes receiving context information associated with the first document. The second document may be rendered based on the context information. In one embodiment, the first document is an Excel spreadsheet file.

In various embodiments, a data processing system for generating documents in native application formats includes a processor and a memory. The memory is coupled to the processor, the memory configured to store a plurality of code modules which when executed by the processor cause the processor to receive a document template as a first document according to a native format, parse the first document to generate an XDTL template representing the document template, generate an XDTL execution document based on the XDTL template, and render a second document according to the native format based on the XDTL execution document.

In various embodiments, a computer program product is stored on a computer readable medium for generating documents in native application formats. The computer program product includes code for receiving a document template as a first document according to a native format, code for parsing the first document to generate an XDTL template representing the document template, code for generating an XDTL execution document based on the XDTL template, and code for rendering a second document according to the native format based on the XDTL execution document.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

The present invention relates to information systems. More specifically, the present invention relates to techniques for creating native documents and reports using templates.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

Figure 1:
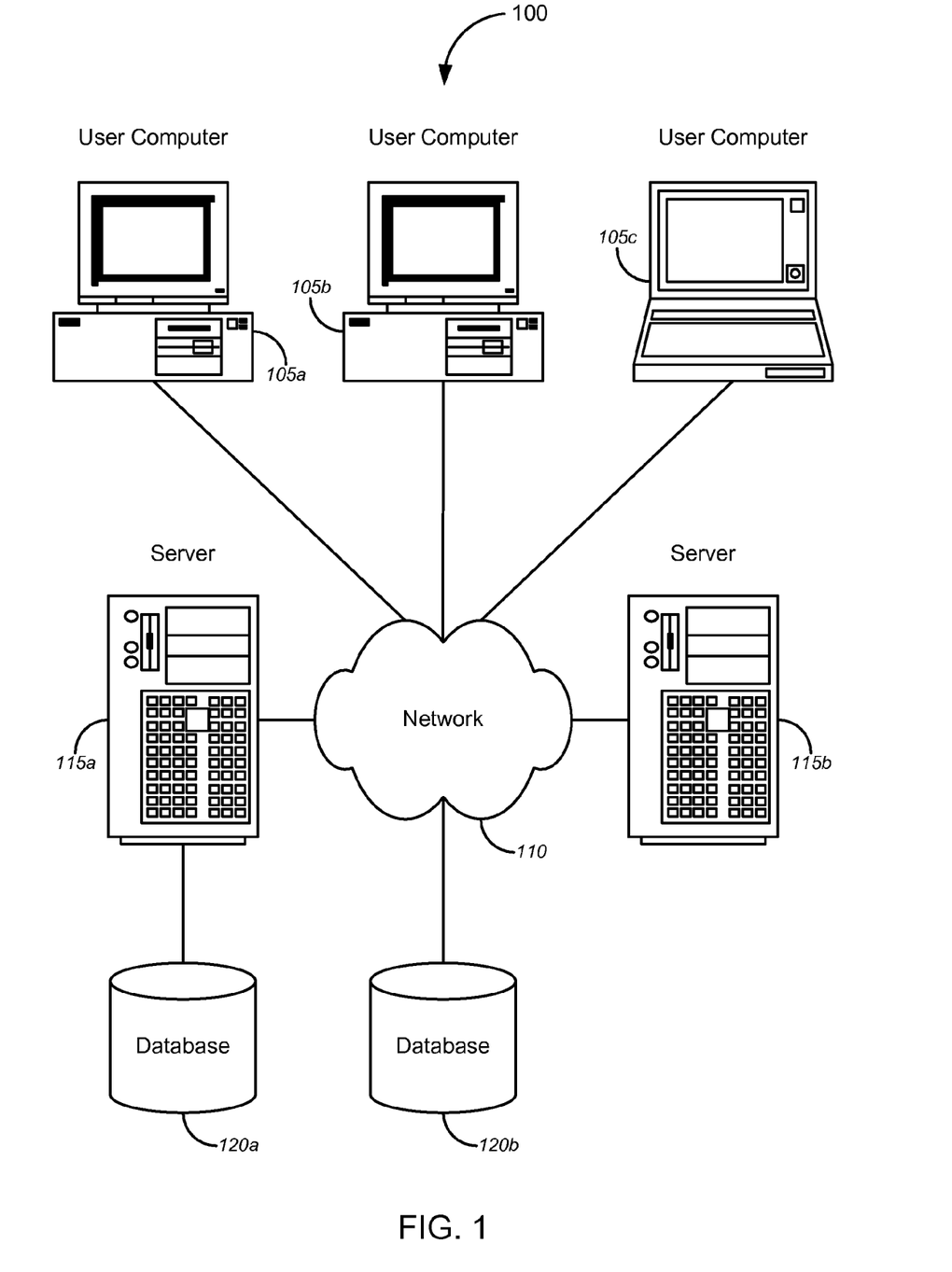
FIG. 1 is a block diagram of a system that may incorporate or implement embodiments of the invention.

A set of embodiments comprises systems for creating native documents and reports using templates. Merely by way of example, FIG. 1 is a block diagram of a system 100 that may incorporate or implement embodiments of the invention. System 100 can include one or more user computers 105 (e.g., user computers 105a, 105b, and 105c). User computers 105 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems.

These user computers 105 can also have any of a variety of applications, including one or more applications configured to perform methods of the invention, as well as one or more office applications, database client and/or server applications, and web browser applications. Alternatively, user computers 105 can be any other electronic device, such as a thin-client computer, Internet-enabled mobile telephone, and/or personal digital assistant, capable of communicating via a network (e.g., network 110 described below) and/or displaying and navigating web pages or other types of electronic documents. Although the exemplary system 100 is shown with three user computers, any number of user computers can be supported.

Certain embodiments of the invention operate in a networked environment, which can include network 110. Network 110 can be any type of network familiar to those skilled in the art that can support data communications using any of a variety of commercially-available protocols, including without limitation TCP/IP, SNA, IPX, AppleTalk, and the like. Merely by way of example, network 110 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 115 (e.g., server computers 115a and 115b). Each of server computers 115 may be configured with an operating system including without limitation any of those discussed above, as well as any commercially-available server operating systems. Each of server computers 115 may also be running one or more applications, which can be configured to provide services to one or more user computers 105 and/or other server computers 115.

Merely by way of example, one of the server computers 115 may be a web server, which can be used, merely by way of example, to process requests for web pages or other electronic documents from user computers 105. The web server can also run a variety of server applications, including HTTP servers, FTP servers, CGI servers, database servers, Java servers, and the like. In some embodiments of the invention, the web server may be configured to serve web pages that can be operated within a web browser on one or more of user computers 105 to perform methods of the invention.

Server computers 115, in some embodiments, might include one ore more file and or/application servers, which can include one or more applications accessible by a client running on one or more of user computers 105 and/or other server computers 115. Merely by way of example, server computers 115 can be one or more general purpose computers capable of executing programs or scripts in response to user computers 105 and/or other server computers 115, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages.

Server computers 115 can also include database servers, including without limitation those commercially available from Oracle, Microsoft, Sybase™, IBM™ and the like, which can process requests from database clients running on one or more user computer 105 and/or other server computers 115. Data provided by an application server may be formatted as web pages (comprising HTML, Javascript, etc., for example) and/or may be forwarded to one or more user computers 105 via a web server (as described above, for example). Similarly, a web server might receive web page requests and/or input data from one or more user computers 105 and/or forward the web page requests and/or input data to an application server.

In accordance with further embodiments, one or more server computers 115 can function as a file server and/or can include one or more of the files necessary to implement methods of the invention incorporated by an application running on one or more user computer 105 and/or other server computers 115. Alternatively, as those skilled in the art will appreciate, a file server can include all necessary files, allowing such an application to be invoked remotely by one or more user computers 105 and/or other server computers 115. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 120 (e.g., databases 120a and 120b). The location of databases 120 is discretionary: merely by way of example, database 120a might reside on a storage medium local to (and/or resident in) server 115a (and/or a user computer 105). Alternatively, database 120b can be remote from any or all of user computers 105 and server computers 115, so long as it can be in communication (e.g., via network 110) with one or more of these. In a particular set of embodiments, a database 120 can reside in a storage-area network ("SAN") familiar to those skilled in the art. (Likewise, any necessary files for performing the functions attributed to one or more user computers 105 and/or other server computers 115 can be stored locally on the respective computer and/or remotely, as appropriate.) In one set of embodiments, databases 120 can be a relational database, such as an Oracle database, that is adapted to store, update, and retrieve data in response to SQL-formatted commands. The database might be controlled and/or maintained by a database server, as described above, for example.

In various embodiments, system 100 enables users to create templates using documents in native application formats. Native application formats refers to the structure or formatting of a document associated with a particular application or set of applications. Some examples of native application formats include XLS files used by Microsoft Excel, DOC files used by Microsoft Word, PPS files used Microsoft PowerPoint, WPD files used by Corel WordPerfect, and the like.

In various embodiment, system 100 enables a user to create an initial document in a spreadsheet program, such as Microsoft Excel, defining appearance, behavior, logic, and static content of a document or report. Behavior can be functions, procedures, scripts, plug-ins, macros, and the like the define user interactions with the document. Logic can be functions, procedures, formulas, scripts, macros, and the like that define interactions, calculations, transformations, between content of the document. Static content can be text, images, or other content to be included in the report, such as standard text for headers and footers, introductory or explanatory text, watermarks or logos, and heading text for charts and tables.

In various embodiments, system 100 parses documents in their native application format to generate templates in a document layout designing language. An example of a document layout designing language is the Extensible Stylesheet Language, or XSL. XSL is an XML-based language for defining the formatting and transformation of data in documents. XSL includes two different standards: XSLT (XSL Transformations) and XSL-FO (XSL Formatting Objects). XSLT defines the transformation of report data in a document. XSLT allows report data to modified, sorted, filtered, or combined in a document. Additionally, XSLT can specify transformations and logic operations to dynamically define the content of a report. For example, XSLT can be used to add, delete, duplicate, or format portions of a report based on the amount and values of report data used for a given instance of a report. XSL-FO defines the formatting of the report, including colors, fonts, and the arrangement of report data. Additional details on XSL can be found in the document "Extensible Stylesheet Language (XSL), Version 1.0, W3C Recommendation 15 Oct. 2001," located at http://www.w3.org/TR/2001/REC-xsl-20011015/, which is incorporated by reference herein.

In some embodiments, system 100 enables users to specify transformations to be performed on data. Transformation tags may be used to modify, sort, filter, or combine data in a document to be rendered in a native application format. Additionally, transformation tags specify transformations and logic operations to dynamically define the content and layout of a document.

In various embodiments, following the creation of an template document, system 100 enables users to save the initial template document. The initial template document can be saved in any file format capable of generating or rendering documents according to the native application format associated with the template document.

In various embodiments, system 100 enables users to generate documents according to native application formats based on previously created templates. The generated or rendered documents may be used by native applications for viewing, editing, printing, and the like.

Figure 2:
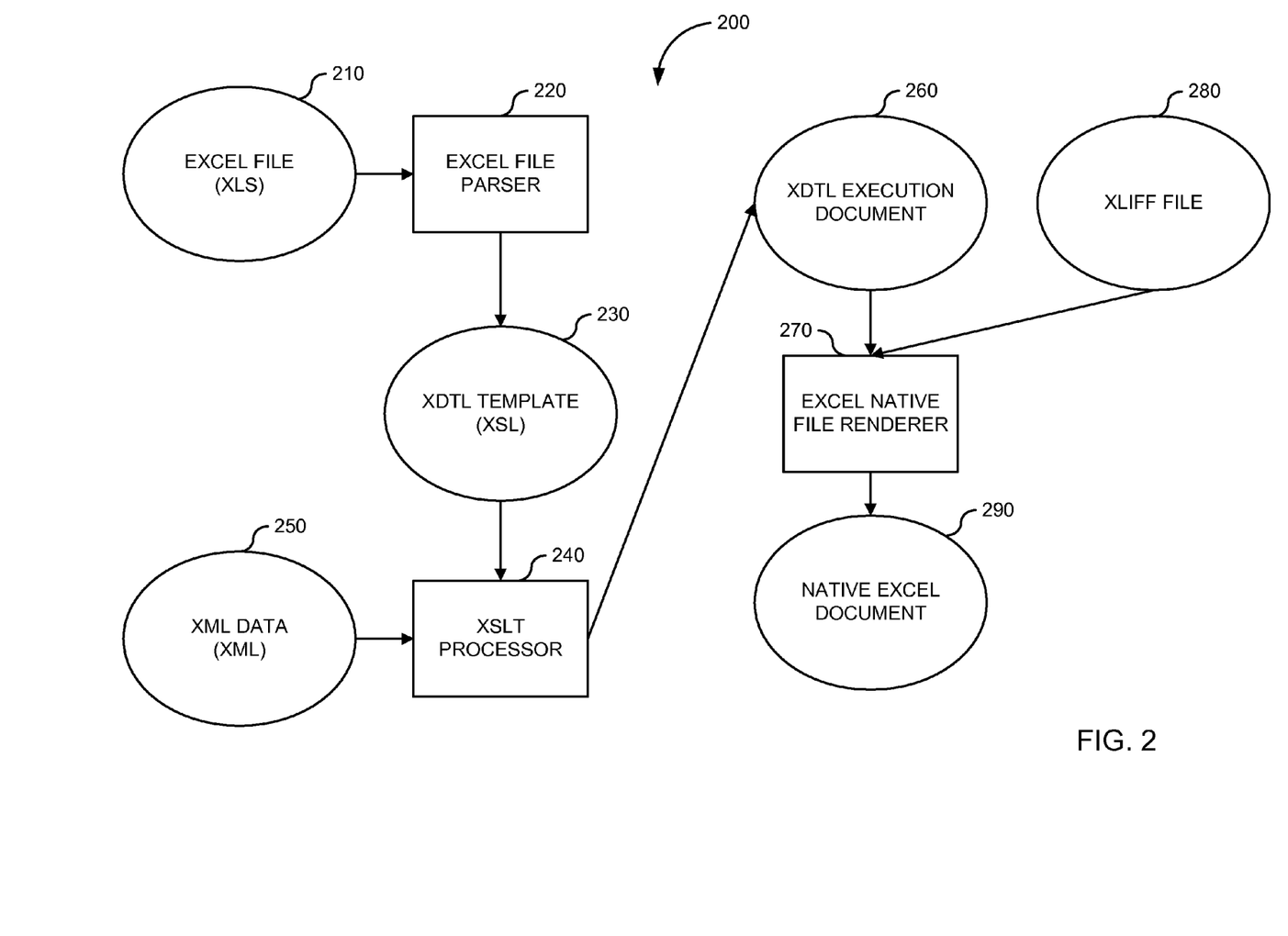
FIG. 2 is a block diagram of a system for creating documents according to native formations in one embodiment according to the invention.

FIG. 2 is a block diagram of a system 200 for creating documents according to native formations in one embodiment according to the invention. In this example, to create and render documents in a native application format, such as Microsoft Excel, a user sends an initial document as a template document to system 200. As discussed above, the initial document 210 can be in any file format capable of being parsed and rendered by system 200. For additional native application formats, a new parser or plug-in may be included to handle the additional native application formats. The following disclosure refers to Microsoft Excel XLS files as an example native application format.

An Excel file parser 220 converts the initial document 210 into a template file in a document layout designing language, such as XSL. In general, an Excel template file describes data fields and constraints, layout of the data fields, and the format of the data fields.

In this example, Excel file parser 220 reads the initial document 210, parses the static content information, formatting information, layout information, logic, and the like, created by a user with Microsoft Excel, and converts this information to an equivalent XSL representation. The output of Excel file parser 220 is a XDTL template 230 expressed in a document layout designing language, such as XSL using XSLT and XSL-FO.

The XDTL template 230 can then be used to automatically create documents from XML data. XSLT processor 240 receives a set of XML-formatted data 250 from a database or other application. The XSLT processor 240 applies the transformations and formatting specified by the XDTL template 230 to the XML-formatted data 250 to create an XDTL execution document 260. XDTL execution document 260 includes all of the data arranged and formatted according to the XDTL template 230. In XDTL execution document 260, the data is transformed and inserted into the report as specified by the XDTL template 230, leaving the data, static content, behavior and logic, and their associated formatting and layout information, expressed for example as XSL-FO attributes. The XDTL execution document 260 can be reused with multiple sets of XML-formatted data to create additional documents with similar formatting that can be rendered in native application formats.

Excel native file render 270 receives XDTL execution document 260, applies any further formatting specified to the data and static content using XLIFF file 280, and outputs a native Excel document 290. In various embodiments, Excel native file render 270 uses defined names to associate XML element data to the range objects and their formats in the native XLS documents. Excel native file render 270 may use a hidden sheet to store additional properties for each defined names, which may allow XSLT syntax to extend manipulation logic for each data. Excel native file render 270 may also use native Excel functionalities that XDO engines cannot deal with, such that portions of the rendered native document will be rendered and processed by Excel (or the native application) itself.

In various embodiments, Excel native file render 270 is part of a FO processor (not shown) that can output a document in any number of native application formats, including PDF documents, RTF documents, HTML documents, DOC documents, PPS documents, and the like.

Figure 3:
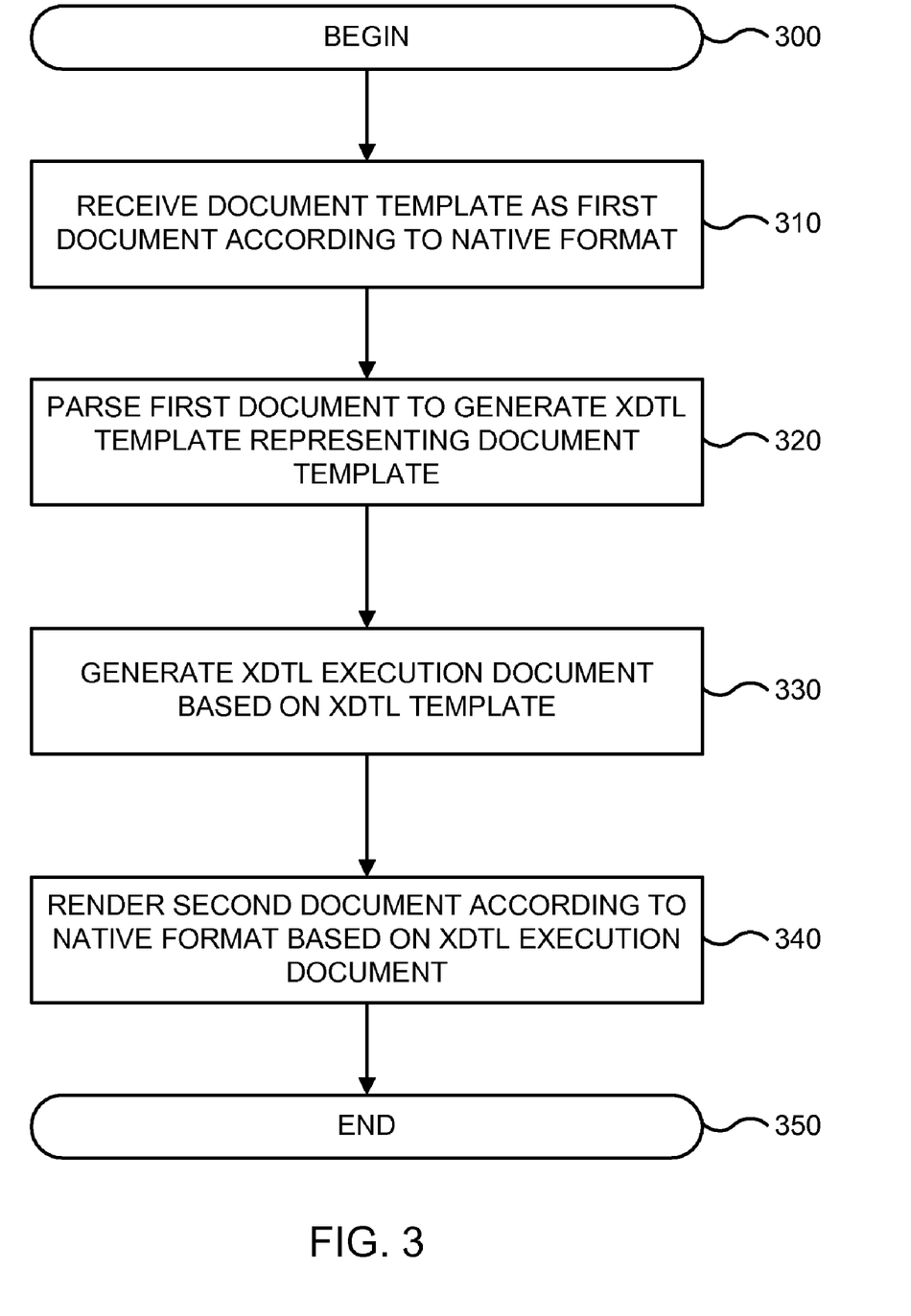
FIG. 3 is a simplified flowchart for generating documents in native file formats in one embodiment according to the invention.

FIG. 3 is a simplified flowchart for generating documents in native file formats in one embodiment according to the invention. The processing depicted in FIG. 3 may be performed by software modules (e.g., instructions or code) executed by a processor of a computer system, by hardware modules of the computer system, or combinations thereof. FIG. 3 begins in step 300.

In step 310, a document template is received as a first document according to a native application format. In step 320, the first document is parsed to generate an XDTL template representing the document template. In general, eXtensible Document Transformation Language (XDTL) defines a process that handles document specific templates, and merges XML data to generate high fidelity documents in a generic way. One example of an Excel file and an XDTL template are described below with respect to FIGS. 6, 7, and 8.

In step 330, an XDTL execution document is generated based on the XDTL template. In general, an XDTL schema for the XDTL execution document may be used to describe the intermediate result sets that represent the output of data process from Excel Template and XML data. The schema generally describes what data should be laid on what location with what format in an Excel file.

In step 340, a second document is rendered according to the native application format based on the XDTL execution document. FIG. 3 ends in step 350.

As described above, system 200 enables a user to create an initial document in a native application format, such as Microsoft Excel. As a result, system 200 enables users to specify transformations to be performed on data and to generate documents according to native application formats based on the previously created templates. The generated or rendered documents may be used by native applications for viewing, editing, printing, and the like.

Figure 4:
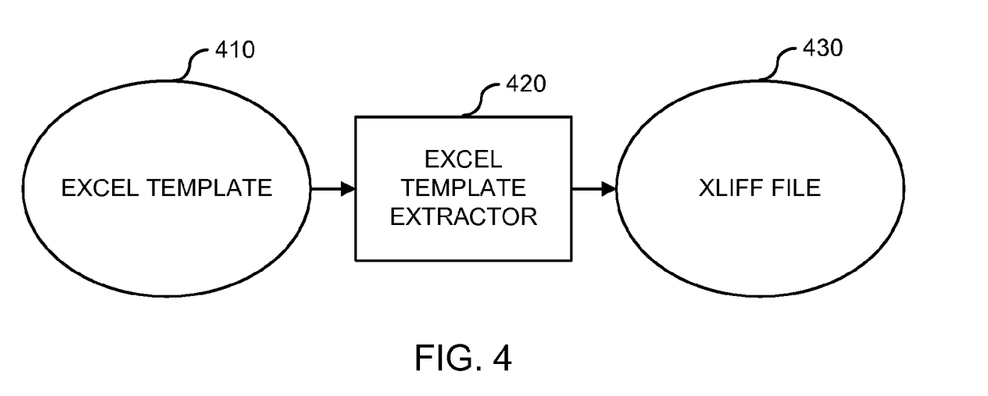
FIG. 4 is a block diagram of an Excel template extractor in one embodiment according to the invention.

FIG. 4 is a block diagram of an Excel template extractor 420 in one embodiment according to the invention. In this example, an Excel document is input into Excel template extractor 420 as an Excel template 410. Excel template extractor 420 parses the Excel template 410 to identify static content, behavior and logic, context information, and layout information. Excel template extractor 420 generates an XLIFF file 430 that includes one or more portions of the static content, behavior and logic, context information, and layout information.

In some embodiments, an Excel data converter may be provided. For example, an Excel document may be input into the Excel data converter. The Excel data converter parses the Excel file to identify portions of data within the Excel file. The Excel data converter then may output static and dynamic data to a data source, such as an XML data file that may be stored in memory, in a file, in a database, and the like.

Figure 5:
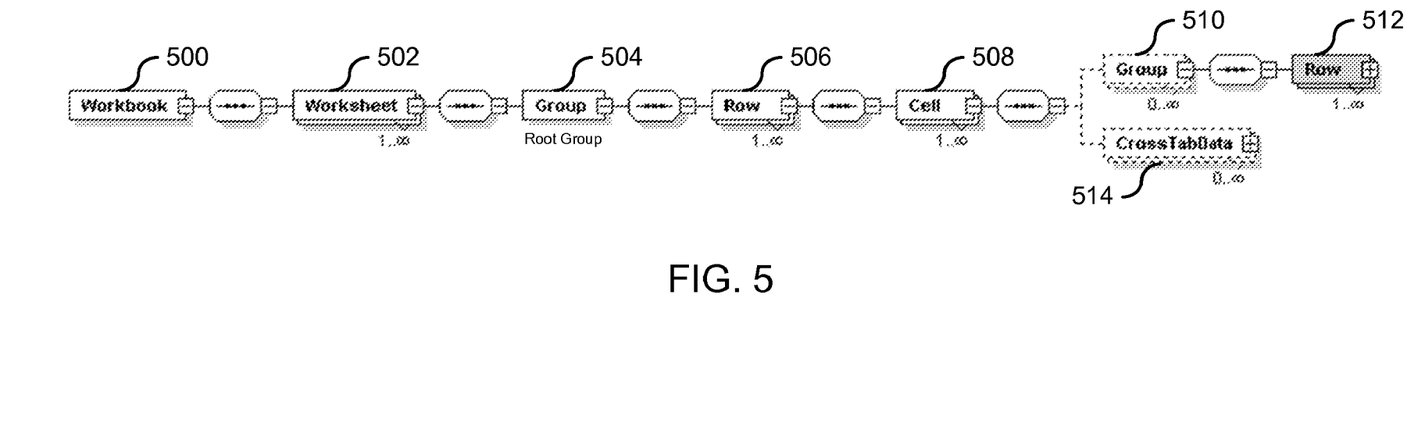
FIG. 5 is a block diagram of a template schema for an Excel native application format in one embodiment according to the invention.

FIG. 5 is a block diagram of a template schema for an Excel native application format in one embodiment according to the invention. Referring to FIG. 5, an Excel workbook 500 may include one or more worksheets 502. A worksheet 502 includes a group 504, also known as a root group. Root group 504 includes one or more rows 506 that include one or more cells 508. A single cell 508 may include a group 510 that may include one or more rows 512. Alternatively, cell 508 may include CrossTabData 514.

As described above, system 200 enables a user to create an initial document in a native application format, such as Microsoft Excel. Accordingly, system 200 may parse workbook 500 to determine the one or more worksheets 502. System 200 generates an XDTL template that includes the structure, layout, and logic of the one or more worksheets 502. Thus, system 200 may generate other documents using workbook 500 as a template to generate or render documents that may be used by native applications for viewing, editing, printing, and the like.

Figure 6:
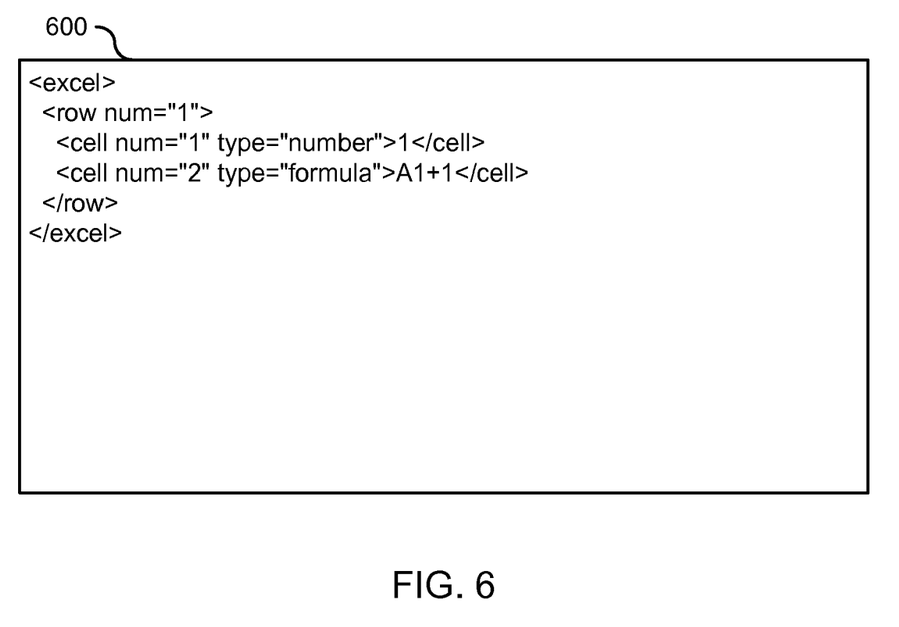
FIG. 6 is a representation of an Excel document in one embodiment according to the invention.

FIG. 6 is a representation of an Excel document 600 in one embodiment according to the invention. In this example, Excel document 600 includes one or more statements defining the native application format. For example:

```
<excel>
    <row num="1">
        <cell num="1" type="number">1</cell>
        <cell num="2" type="formula">A1+1</cell>
    </row>
</excel>
```

System 200 parses the native application format to generate a document template that represents the Excel document 600. For example, system 200 determines that the Excel document includes one workbook 500, one worksheet 502, and one root group 504. Root group 504 includes one row 506 (e.g., <row num="1">). Row 506 includes two cells 508, and so one.

Figure 7:
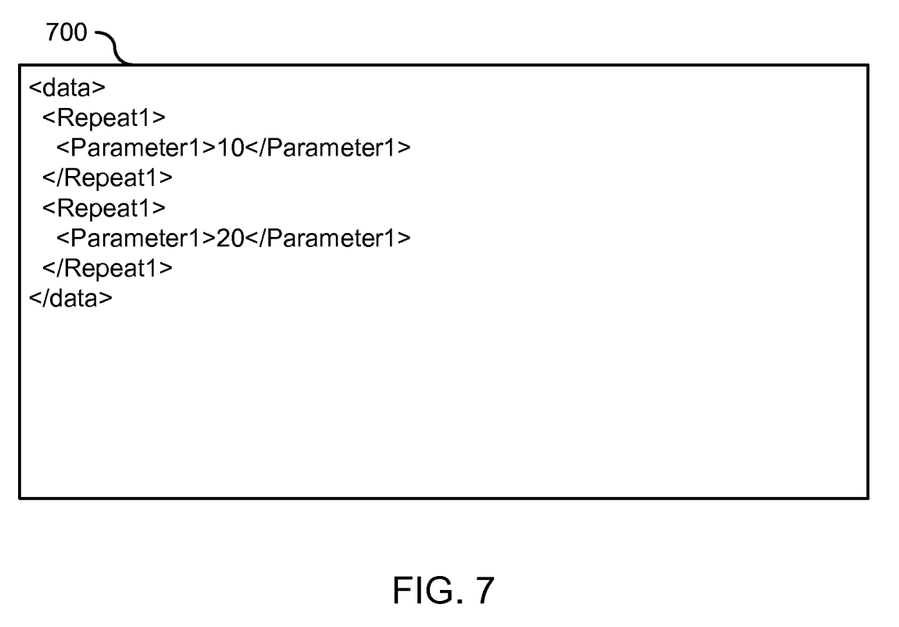
FIG. 7 is a representation of XML data in one embodiment according to the invention.

FIG. 7 is a representation of XML data 700 in one embodiment according to the invention. In this example, XML data 700 includes data and one or more statements for defining the layout or context of the data. For example:

```
<data>
    <Repeat1>
        <Parameter1>10</Parameter1>
    </Repeat1>
    <Repeat1>
        <Parameter1>20</Parameter1>
    </Repeat1>
</data>
```

Figure 8:
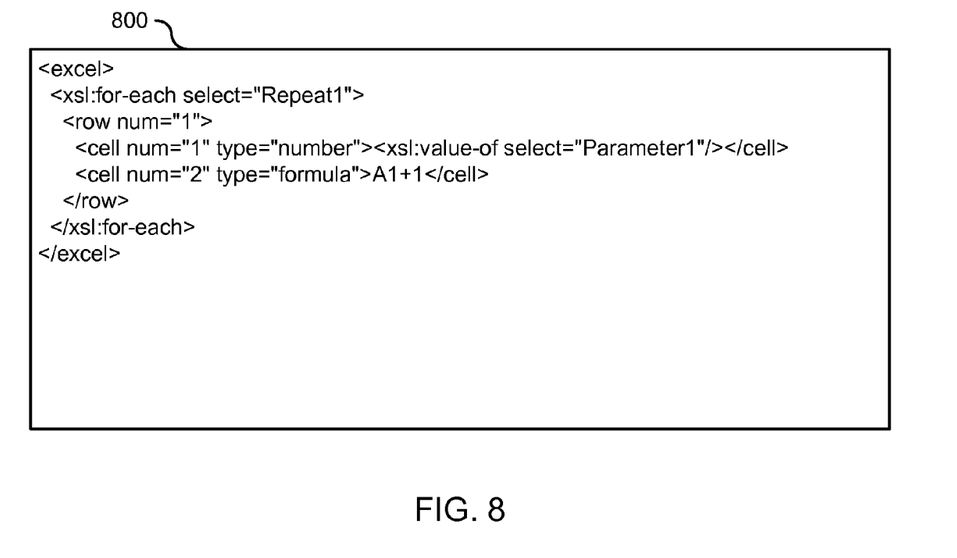
FIG. 8 is a representation of an XDTL template merged with the XML data of FIG. 7 in one embodiment according to the invention.

FIG. 8 is a representation of an XDTL template 800 merged with XML data 700 of FIG. 7 in one embodiment according to the invention. In this example, XDTL template 800 is essentially an XSLT file having the following:

```
<excel>
    <xsl:for-each select="Repeat1">
        <row num="1">
            <cell num="1" type="number"><xsl:value-of
            select="Parameter1"/></cell>
            <cell num="2" type="formula">A1+1</cell>
        </row>
    </xsl:for-each>
</excel>
```

Figure 9:
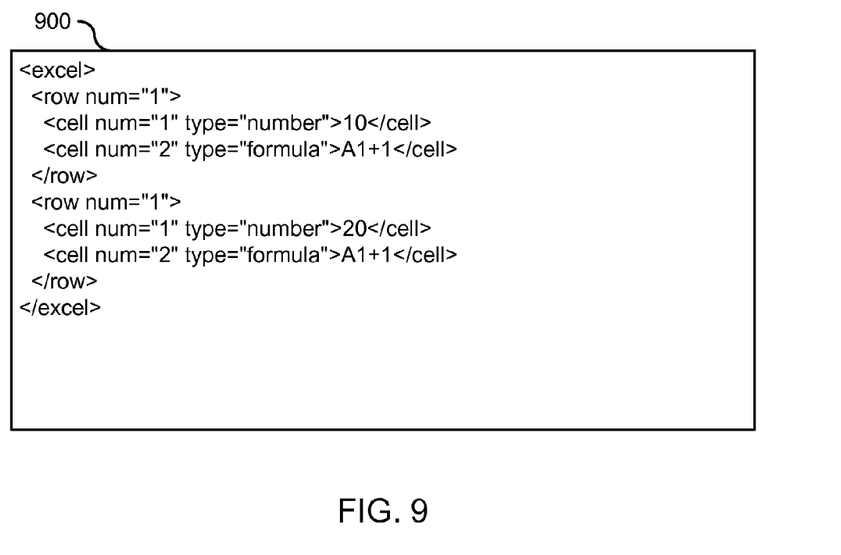
FIG. 9 is a representation of an XDTL execution document in one embodiment according to the invention.

FIG. 9 is a representation of an XDTL execution document 900 in one embodiment according to the invention. In this example, XDTL template 800 is transformed into XDTL execution document 900. System 200 then may execute XDTL execution document 900 to generate a document in a native application format.

In this example, XDTL execution document 900 is essentially an file having the following:

```
<excel>
    <row num="1">
        <cell num="1" type="number">10</cell>
        <cell num="2" type="formula">A1+1</cell>
    </row>
    <row num="1">
        <cell num="1" type="number">20</cell>
        <cell num="2" type="formula">A1+1</cell>
    </row>
</excel>
```

XDTL execution document 900 then may be rendered or executed to generate an Excel document in its native format. The final document then may be used with native applications to view reports or business documents.

As described above, system 200 enables a user to create an initial document in a native application format, such as Microsoft Excel. As a result, system 200 enables users to specify transformations to be performed on data and to generate documents according to native application formats based on the previously created templates. The generated or rendered documents may be used by native applications for viewing, editing, printing, and the like.

Figure 10:
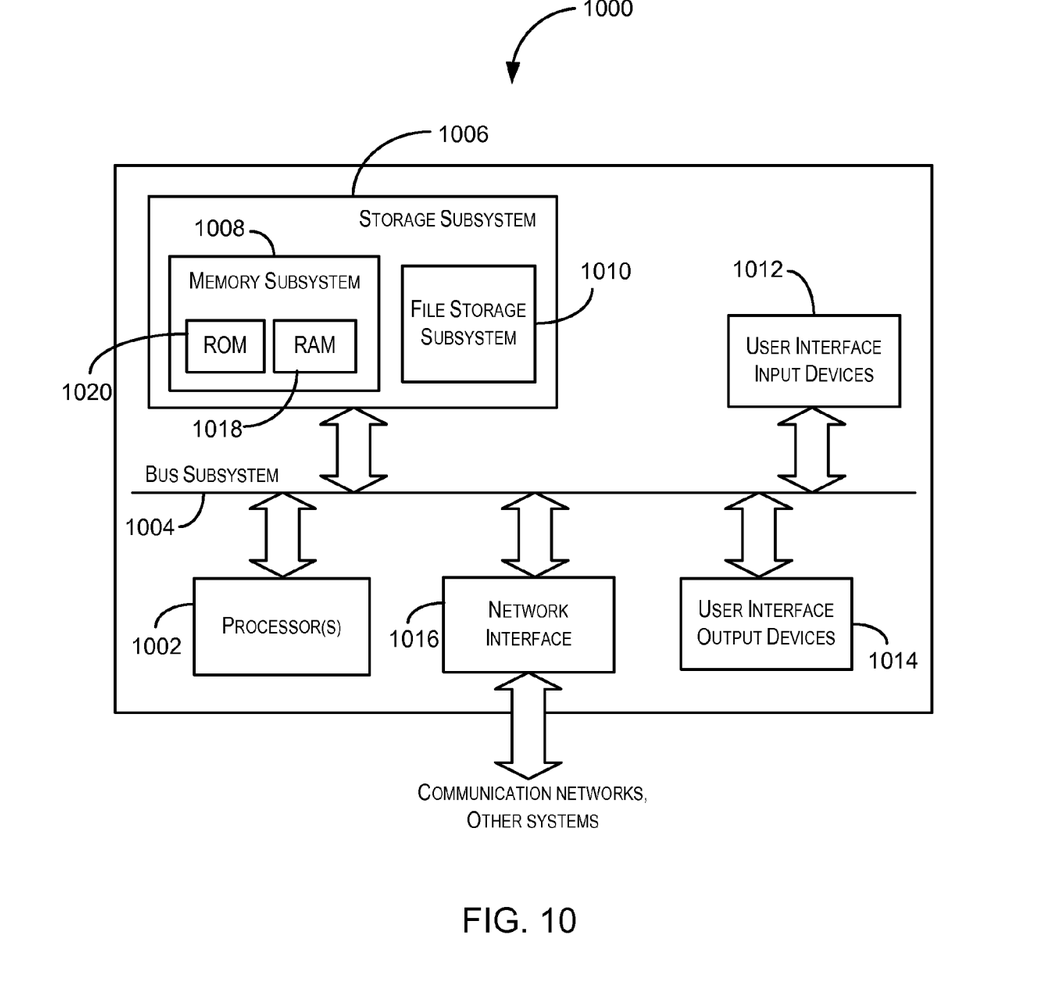
FIG. 10 is a simplified illustration of a computer system XX that may incorporate an embodiment of the present invention.

FIG. 10 is a simplified illustration of a computer system 1000 that may incorporate an embodiment of the present invention. FIG. 10 is merely illustrative of an embodiment incorporating the present invention and does not limit the scope of the invention as recited in the claims. One of ordinary skill in the art would recognize other variations, modifications, and alternatives.

As shown in FIG. 10, computer system 1000 includes a processor 1002 that communicates with a number of peripheral devices via a bus subsystem 1004. These peripheral devices may include a storage subsystem 1006, comprising a memory subsystem 1008 and a file storage subsystem 1010, user interface input devices 1012, user interface output devices 1014, and a network interface subsystem 1016.

Bus subsystem 1004 provides a mechanism for letting the various components and subsystems of computer system 1000 communicate with each other as intended. Although bus subsystem 1004 is shown schematically as a single bus, alternative embodiments of the bus subsystem may utilize multiple busses.

Network interface subsystem 1016 provides an interface to other computer systems, and networks, and devices. Network interface subsystem 1016 serves as an interface for receiving data from and transmitting data to other systems from computer system 1000.

User interface input devices 1012 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1000.

User interface output devices 1014 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 may be configured to store the basic programming and data constructs that provide the functionality of the present invention. Software (code modules or instructions) that provides the functionality of the present invention may be stored in storage subsystem 1006. These software modules or instructions may be executed by processor(s) 1002. Storage subsystem 1006 may also provide a repository for storing data used in accordance with the present invention. Storage subsystem 1006 may comprise memory subsystem 1008 and file/disk storage subsystem 1010.

Memory subsystem 1008 may include a number of memories including a main random access memory (RAM) 1018 for storage of instructions and data during program execution and a read only memory (ROM) 1020 in which fixed instructions are stored. File storage subsystem 1010 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1000 can be of various types including a personal computer, a portable computer, a workstation, a network computer, a mainframe, a kiosk, or any other data processing system. Due to the ever-changing nature of computers and networks, the description of computer system 1000 depicted in FIG. 10 is intended only as a specific example for purposes of illustrating the preferred embodiment of the computer system. Many other configurations having more or fewer components than the system depicted in FIG. 10 are possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for generating Excel spreadsheet documents, the method comprising:
receiving, at one or more computer systems, a first Excel spreadsheet document, the first Excel spreadsheet document providing an overall document layout for data stored in the first Excel spreadsheet document file;
generating, with one or more processors associated with the one or more computer systems, an XDTL template that represents a document template of at least the overall document layout for the data stored in the first Excel spreadsheet document file in response to parsing the first Excel spreadsheet document file, the XDTL template including one or more tags configured as data placeholders for different data, the one or more tags replicating locations of the data stored in the first Excel spreadsheet document file for the different data;
storing the XDTL template in a database associated with the one or more computer systems;
generating, with the one or more processors associated with the one or more computer systems, an XDTL execution document based on retrieving the XDTL document template from the database; and
rendering, with the one or more processors associated with the one or more computer systems, a second Excel spreadsheet document file based on the retrieved XDTL document template, data stored in the second Excel spreadsheet document file being different from the data stored in the first Excel spreadsheet document file, the data stored in the second Excel spreadsheet document file having the same overall document layout as provided by the first Excel spreadsheet document file for the data stored in the first Excel spreadsheet document file.

2. The method of claim 1 further comprising:
receiving data from a database; and
wherein generating the XDTL execution document comprises performing one or more transformations specified by the XDTL template with the data retrieved from the database and storing the transformed data in the XDTL execution document.

3. The method of claim 1 further comprising:
receiving one or more named parameters associated with the first document file; and
wherein generating the XDTL execution document comprises generating one or more statements representing the named parameters associated with the first document file and storing the one or more statements in the XDTL execution document.

4. The method of claim 1 further comprising:
receiving logic associated with the first document file; and
wherein generating the XDTL execution document comprises generating one or more statements representing the logic associated with the first document and storing the one or more statements in the XDTL execution document.

5. The method of claim 1 further comprising:
receiving additional layout information not associated with the overall document layout provided by the first document file for the data stored in the first document file; and
wherein rendering the second document in the predetermined native application format comprises rendering the second document based on the additional layout information.

6. The method of claim 1 further comprising:
receiving context information associated with the first document file; and
wherein rendering the second document in the predetermined native application format comprises rendering the second document based on the context information.

7. A data processing system for generating documents in native application formats, the system comprising:
a processor; and
a memory coupled to the processor, the memory configured to store a plurality of code modules which when executed by the processor cause the processor to:
receive a first document file in a predetermined native application format, data stored in the first document file formatted according to the predetermined native application format, the first document file providing an overall document layout for the data stored in the first document file;
generate an XDTL template that represents a document template of at least the overall document layout for the data stored in the first document file in response to parsing the first document file according to the predetermined native application format, the XDTL template including one or more tags configured as data placeholders for different data, the one or more tags replicating locations of the data stored in the first document file for the different data;
generate an XDTL execution document based on the XDTL template; and
render a second document file in the predetermined native application format based on the XDTL document template, data stored in the second document file being different from the data stored in the first document file, the data stored in the second document file formatted according to the predetermined native application format and having the same overall document layout as provided by the first document file for the data stored in the first document file.

8. The system of claim 7 wherein the processor is further configured to:
receive data from a database; and
perform one or more transformations specified by the XDTL template with the data retrieved from the database and store the transformed data in the XDTL execution document.

9. The system of claim 7 wherein the processor is further configured to:
receive one or more named parameters associated with the first document file; and
generate one or more statements representing the named parameters associated with the first document file and store the one or more statements in the XDTL execution document.

10. The system of claim 7 wherein the processor is further configured to:
   receive logic associated with the first document file; and
   generate one or more statements representing the logic associated with the first document file and store the one or more statements in the XDTL execution document.

11. The system of claim 7 wherein the processor is further configured to:
   receive additional layout information not associated with the overall document layout provided by the first document file for the data stored in the first document file; and
   render the second document based on the additional layout information.

12. The system of claim 7 wherein the processor is further configured to:
   receive context information associated with the first document file; and
   render the second document based on the context information.

13. The system of claim 7 the processor is configured receive the first document file as an Excel spreadsheet file.

14. A non-transitory computer-readable medium storing computer-executable code for generating documents in native application formats, the computer-readable medium comprising:
   code for receiving a first document file in a predetermined native application format, data stored in the first document file formatted according to the predetermined application native format, the first document file providing an overall document layout for the data stored in the first document file;
   code for generating an XDTL template that represents a document template of at least the overall document layout for the data stored in the first document file in response to parsing the first document file according to the predetermined native application format, the XDTL template including one or more tags configured as data placeholders for different data, the one or more tags replicating locations of the data stored in the first Excel spreadsheet document file for the different data;
   code for generating an XDTL execution document based on the XDTL template; and
   code for rendering a second document file in the predetermined native application format based on the XDTL document template, data stored in the second document file being different from the data stored in the first document file, the data stored in the second document file formatted according to the predetermined native application format and having the same overall document layout as provided by the first document file for the data stored in the first document file.

15. The computer-readable medium of claim 14 further comprising:
   code for receiving data from a database; and
   wherein the code for generating the XDTL execution document comprises code for performing one or more transformations specified by the XDTL template with the data retrieved from the database and storing the transformed data in the XDTL execution document.

16. The computer-readable medium of claim 14 further comprising:
   code for receiving one or more named parameters associated with the first document file; and
   wherein the code for generating the XDTL execution document comprises code for generating one or more statements representing the named parameters associated with the first document file and storing the one or more statements in the XDTL execution document.

17. The computer-readable medium of claim 14 further comprising:
   code for receiving logic associated with the first document file; and
   wherein the code for generating the XDTL execution document comprises code for generating one or more statements representing the logic associated with the first document filed and storing the one or more statements in the XDTL execution document.

18. The computer-readable medium of claim 14 wherein the code for rendering the second document in the native format comprises:
   code for receiving additional layout information not associated with the overall document layout provided by the first document file for the data stored in the first document file; and
   code for rendering the second document based on the additional layout information.

19. The computer-readable medium of claim 14 wherein the code for rendering the second document in the native format comprises:
   code for receiving context information associated with the first document file; and
   code for rendering the second document based on the context information.

* * * * *

UNITED STATES PATENT AND TRADEMARK OFFICE
CERTIFICATE OF CORRECTION

| | | |
|---|---|---|
| PATENT NO. | : 8,095,870 B2 | Page 1 of 1 |
| APPLICATION NO. | : 11/758783 | |
| DATED | : January 10, 2012 | |
| INVENTOR(S) | : Jiang et al. | |

It is certified that error appears in the above-identified patent and that said Letters Patent is hereby corrected as shown below:

In column 4, line 51, delete "one ore more" and insert -- one or more --, therefor.

In column 13, line 20, in Claim 13, after "claim 7" insert -- wherein --.

In column 13, line 20, in Claim 13, after "configured" insert -- to --.

In column 14, line 29, in Claim 17, delete "filed" and insert -- file --, therefor.

Signed and Sealed this
Tenth Day of April, 2012

David J. Kappos
*Director of the United States Patent and Trademark Office*